United States Patent Office 3,457,443
Patented July 22, 1969

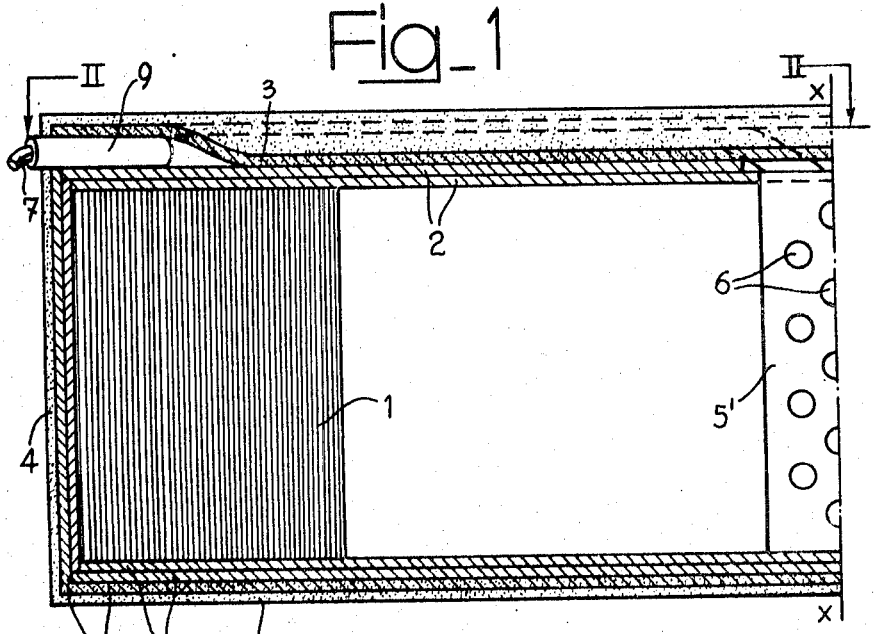
Fig_1
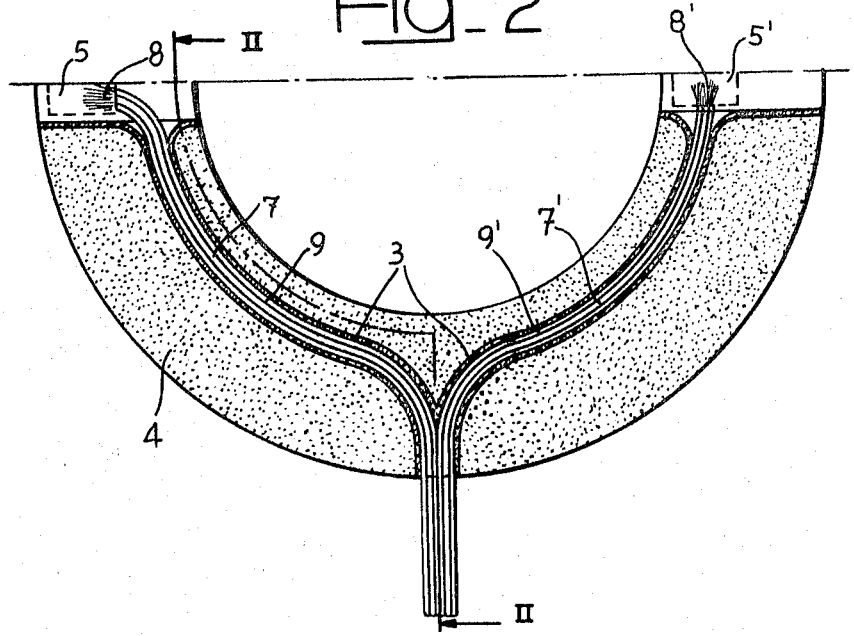
Fig_2

3,457,443
EDGEWISE HELICALLY WOUND STRIP MOTOR WINDING WITH COMPOSITE HIGH TEMPERATURE INSULATION
Aurelio Menini, Turin, Italy, assignor to Fiat Società per Azioni, Turin, Italy
Filed Apr. 16, 1968, Ser. No. 721,640
Claims priority, application Italy, Apr. 19, 1967, 794,428/67
Int. Cl. H02k 3/00
U.S. Cl. 310—179          12 Claims

ABSTRACT OF THE DISCLOSURE

An electric motor winding with high temperature insulation formed with an edgewise helically wound aluminum strip conductor with superficial surface oxide layer providing insulation between turns. The high temperature insulation may comprise an inner layer of dielectric material, as layers of mica, an insulating binding of fibrous material (e.g., asbestos impregnated with ceramic-containing cement) around the inner layer for mechanical strength, and an outer ceramic casing. Silver plates are provided at winding ends for lead connections.

---

This invention relates to electric motor windings, more particularly windings for motors operable at temperatures above 300° C.

Windings for electric motors are known which operate at temperatures above the normal operating temperature, which is of the order of 180° C., as a result of surrounding conditions or of the heating effect of the electric current in the windings. Such windings are generally made up of copper wire and have insulation containing silicone and fluorinated compounds provided either as a coating on the wire or as an impregnating medium in the winding.

Windings of this type cannot, however, be employed at temperatures exceeding 300° C. owing to the chemical instability of the above-mentioned materials in contact with air.

Special winding constructions have been adopted to enable temperatures above 300° C. to be reached, employing, for example, nickel-plated copper wire and a ceramic insulation.

An object of the present invention is to simplify the construction of windings for electric motors operable at temperatures above 300° C., and to permit the use of narrowly wound conductors of large cross sectional area.

With this object in view the present invention provides an electric motor winding operable at high temperatures exceeding 300° C. and comprising: (i) a plurality of helical turns of conductive strip concentric with the axis of the winding; (ii) a superficial insulating oxide layer on the strip between adjacent said turns; (iii) insulation means surrounding the said turns and insulating the strip from the outside, said insulation means being resistant to said high temperatures, and (iv) current supply leads connected to the ends of the conductive strip and passing through said insulation means.

A further object is to provide in such a winding an insulation which has high mechanical, chemical and thermal stability and which permits a high proportion of the available volume within the winding to be filled with conductive material, the winding being strong and stable in size and shape at high temperature.

Preferably, therefore, the said insulation means comprise: (i) an inner layer of dielectric materials; (ii) an insulating binding of fibrous material which surrounds the inner layer and which maintains its mechanical strength and insulating properties at said high temperatures, and (iii) a heat-resistant protective casing enclosing said insulating binding and imparting a prescribed shape and size thereto.

The invention will be more clearly understood from the following detailed description, given by way of nonlimiting example, and referring to the accompanying drawing, wherein:

FIGURE 1 is a diagrammatical axial sectional view of one half of a toroidal winding for an electric motor according to one embodiment of the invention, and FIGURE 2 is a diagrammatical cross sectional view on line II—II of FIGURE 1 of the said half of the motor winding.

Referring to the drawing, the winding according to the invention comprises a plurality of helical turns of a superficially oxidized aluminum strip 1, having a width slightly less than the overall axial length of the winding, wound in spiral form concentrically with the axis X—X of the winding. The superficial oxidation of the strip 1 acts as an insulation between the contiguous turns of the winding. The thickness of the aluminum strip 1 and its aluminum oxide surface layer is such as to afford high flexibility, high strength and easy winding of the strip 1.

The wound aluminum strip 1 is insulated from the outside by a composite insulation including superposed inner layers 2 of mica which fully enclose the winding. An asbestos binding 3 impregnated with a ceramic-containing cement surrounds the inner mica layers 2 and is enclosed in turn by a ceramic casing 4 which is bonded to the asbestos binding 3 and which acts as a mechanical protection for the winding.

The impregnating cement and the casing 4 contain ceramic products which maintain good dielectric properties at temperatures of the order of 600° C. The cement establishes a compact non-crumbling connection between the layers 2 and the binding 3 which is resistant to thermal cycling up to 600° C.

Electrical connections are provided at the ends of the winding in the form of two silver plates 5, 5' connected to the ends of the spirally wound aluminum strip 1 by welding or soldering in the region of holes 6 bored in the plates 5, 5'.

The plates 5, 5' are provided with respective lips bent over against one end face of the winding. The ends of respective current supply leads 7, 7' comprising multiple strand flexible silver wire 7, 7' are brazed at 8, 8' to the plates 5, 5' respectively. The leads 7, 7' are electrically insulated by glass sleeves 9, 9' coaxially surrounding the leads 7, 7' respectively and extending to the outside of the winding through the insulation.

Further mica layers are superimposed on the brazed joints 8, 8' and insulate the joints 8, 8' and the leads 7, 7' from the wound strip 1 and from the outside.

The silver leads 7, 7' enclosed in the respective sleeves 9, 9' are enveloped by the binding 3 and embedded in the ceramic casing 4, as shown in FIGURE 2. The leads 7, 7', while being flexible, maintain a strong connection to the winding which is resistant to thermal cycling and high temperature operation at temperatures of the order of 600° C.

It will be appreciated that many modifications of the illustrated embodiment can be made without departing from the scope of the invention. For example, the winding may be formed by superposed partial windings having their ends interconnected in series or in parallel, the entire winding being enclosed by a single insulating binding 3 and a single casing 4 of the type as herein described.

What is claimed is:

1. Electric motor winding operable at high temperatures exceeding 300° C. and comprising:
 (i) a plurality of helical turns of conductive strip concentric with the axis of the winding;

(ii) a superficial insulating oxide layer on the strip between adjacent said turns;

(iii) insulation means surrounding the said turns and insulating the strip from the outside, said insulation means being resistant to said high temperatures, and (iv) current supply leads connected to the ends of the conductive strip and passing through said insulation means.

2. Winding as claimed in claim 1 wherein said insulation means comprise:

(i) an inner layer of dielectric material;

(ii) an insulating binding of fibrous material which surrounds the inner layer and which maintains its mechanical strength and insulating properties at said high temperatures, and (iii) a heat-resistant protective casing enclosing said insulating binding and imparting a prescribed shape and size thereto.

3. Winding as claimed in claim 2 and further including an impregnating insulating medium which maintains its delectric properties at said high temperatures and which maintains a compact non-crumbling bond between the said inner layer and the insulating binding.

4. Winding as claimed in claim 1 wherein each current supply lead comprises flexible multiple strand wire having a respective connection to the conductive strip which is unaffected by operation and thermal cycling at said high temperatures.

5. Winding as claimed in claim 1 wherein the current supply leads comprise respective silver leads and the conductive strip has two terminations comprising respective silver plates, each said plate having a respective lip bent-over against one end face of the winding, and means connecting each said lip to a said silver lead.

6. Winding as claimed in claim 5 wherein said silver plates and said leads are embedded within said protective casing.

7. Winding as claimed in claim 1 wherein respective glass sleeves enclose the respective leads where said leads pass through the insulation means.

8. Winding as claimed in claim 1 wherein said conductive strip is formed of superifically oxidized aluminum.

9. Winding as claimed in claim 2 wherein the inner layer of dielectric material is formed of mica.

10. Winding as claimed in claim 2 wherein said casing comprises inorganic ceramic products which maintain high dielectric properties at temperatures of the order of 600° C.

11. Winding as claimed in claim 3 wherein the impregnating insulating medium contains inorganic cemaric products.

12. Winding as claimed in claim 2 wherein the fibrous material of said insulating binding comprises asbestos.

References Cited

UNITED STATES PATENTS

| | | | |
|---|---|---|---|
| 830,419 | 9/1906 | Downes | 336—192 |
| 2,756,358 | 7/1956 | Johnson | 310—180 |
| 3,353,040 | 11/1967 | Abbott | 310—27 |

WARREN E. RAY, Primary Examiner

U.S. Cl. X.R.

310—71, 195, 210